US012014609B2

(12) United States Patent
Stone et al.

(10) Patent No.: US 12,014,609 B2
(45) Date of Patent: Jun. 18, 2024

(54) CASH DRAWER EXOSKELETON SYSTEM

(71) Applicant: APG Cash Drawer, LLC, Fridley, MN (US)

(72) Inventors: Robert Hamilton Stone, Woodstock, GA (US); Scott Benjamin Johnson, Minneapolis, MN (US); Nicholas Edward Maffey, Atlanta, GA (US); Russell Joseph Kroll, Atlanta, GA (US)

(73) Assignee: APG Cash Drawer, LLC, Fridley, MN (US)

( * ) Notice: Subject to any disclaimer, the term of this patent is extended or adjusted under 35 U.S.C. 154(b) by 0 days.

(21) Appl. No.: 17/969,093

(22) Filed: Oct. 19, 2022

(65) Prior Publication Data

US 2023/0124957 A1 Apr. 20, 2023

Related U.S. Application Data

(60) Provisional application No. 63/262,775, filed on Oct. 20, 2021.

(51) Int. Cl.
*G07G 1/00* (2006.01)

(52) U.S. Cl.
CPC .................................. *G07G 1/0027* (2013.01)

(58) Field of Classification Search
None
See application file for complete search history.

(56) References Cited

U.S. PATENT DOCUMENTS

| | | | | |
|---|---|---|---|---|
| 2003/0222140 A1* | 12/2003 | Wasson | G07G 1/0018 235/383 |
| 2006/0055292 A1* | 3/2006 | Specht | G07G 1/0018 312/290 |
| 2013/0020445 A1 | 1/2013 | Kasick et al. | |

FOREIGN PATENT DOCUMENTS

| | | |
|---|---|---|
| CN | 208062150 U | 11/2018 |
| CN | 211895541 U | 11/2020 |
| CN | 213070007 U | 4/2021 |
| KR | 200418778 Y1 | 6/2006 |

OTHER PUBLICATIONS

Integration System Caddy SP Organizer—APG Cash Drawer, LLC, Bearing Copyright 2017, 2 pages.
Integration System Caddy SPM Organizer—APG Cash Drawer, LLC, Bearing Copyright 2010, 2 pages.

* cited by examiner

*Primary Examiner* — Suezu Ellis
(74) *Attorney, Agent, or Firm* — Christopher R. Christenson; Kelly, Holt & Christenson, P.L.L.C.

(57) ABSTRACT

A cashdrawer exoskeleton system is disclosed. The system includes a modular base piece with an integrated fastener configured to facilitate a coupling to a cash drawer. An aperture is formed through the top surface of the modular base piece and leads to an area where the cash drawer is positioned when the modular base piece is coupled to the cash drawer utilizing the integrated fastener. At least one spacer is then configured to facilitate creation of a gap between the modular base piece and the cash drawer when the modular base piece is coupled to the cash drawer utilizing the integrated fastener.

18 Claims, 6 Drawing Sheets

CASH DRAWER EXOSKELETON SYSTEM

CROSS-REFERENCE TO RELATED APPLICATION

The present application is based on and claims the benefit of U.S. Provisional Patent Application Ser. No. 63/262,775, filed Oct. 20, 2021, the content of which is hereby incorporated by reference in its entirety.

BACKGROUND

Checkout counter space is some of the most valuable real estate inside a retail store. An organized, neat counter with accessible point-of-purchase items projects care and intention to customers. However, too often retail counters are messy. Especially at small stores, it is common to find cash drawers, scanners, printers, and monitors from different vendors all tied together by an entanglement of Ethernet cables, power supplies and extension cords visible to shoppers. There is an opportunity to create a better experience for the customer.

To keep shoppers coming back, retailers need to focus on the customer experience. This is more important than ever as brick-and-mortar stores look to compete with online retailers, which have made significant gains in recent years. Tidiness plays a crucial role in drawing customers. And no space in a retail store is more eye-catching to a customer than the Point of Sale (POS) counter. A clean, organized counter can turn a casual shopper into a lifetime customer, especially in small neighborhood shops.

To help manage cable clutter on counters, merchants must figure out what to do with the mess of components that typically sit on counters. POS systems that share space haphazardly with printers, card readers and other components often create a spaghetti-like mess of cords and devices. The mess makes all components and systems difficult for sales associates to manage, gets in the way of opening and closing cash drawers, and sometimes even snags on people walking by.

Shoppers can be unforgiving. There is a need for flexibly and effectively addressing at least these noted challenges.

SUMMARY

Embodiments of a cashdrawer exoskeleton system are disclosed. In one embodiment, a modular base piece has an integrated fastener configured to facilitate a cupling to a cash drawer. An aperture is formed through the top surface of the modular base piece and leads to an area where the cash drawer is positioned when the modular base piece is coupled to the cash drawer utilizing the integrated fastener. At least one spacer is then configured to facilitate creation of a gap between the modular base piece and the cash drawer when the modular base piece is coupled to the cash drawer utilizing the integrated fastener.

DETAILED DESCRIPTION OF ILLUSTRATIVE EMBODIMENTS

Figure 1:
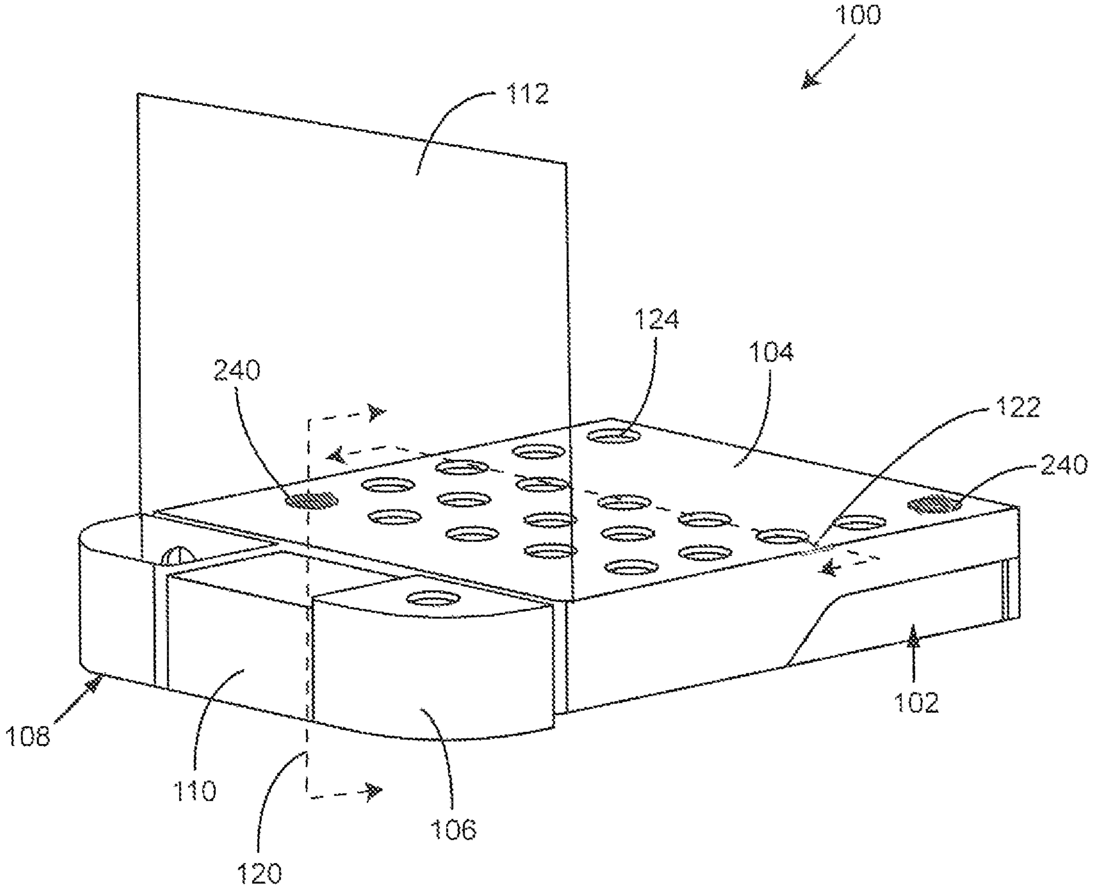
FIG. 1 is a perspective view of an embodiment of a cash drawer exoskeleton system shown in connection with a cash drawer.

FIG. 1 is a perspective view of an embodiment of a cash drawer exoskeleton system 100 shown in connection with a cash drawer 102. It is to be understood that not all components of the cash drawer exoskeleton system 100 are not mandatory. In other words, it is conceived for it to not be critical that any one part of the cash drawer exoskeleton system 100 be included in a given implementation. Further, other and/or duplicate components may be added. The nature of this modularity is true of any and all embodiments of the cash drawer exoskeleton system described herein. Its flexibility is one of the system's appealing attributes.

Cash drawer exoskeleton system 100 includes a modular base piece 104, a cup 106, a cup 108, a printer 110 and a screen 112. Cash drawer 102 as shown is illustratively a standard cash drawer. Cash drawer 102 and system 100 can be constructed of any type of material or combination of materials. For example, steel and plastic or two of many materials that are specifically contemplated.

Modular base piece 104 is illustratively configured to couple over cash drawer 102. In one embodiment, the coupling is such that modular base piece 104 is removable from the cash drawer 102. However, in one embodiment, the coupling is such that the modular base piece "snaps onto" or otherwise connects with drawer 102 such that lifting the base piece 104 into the air will cause the cash drawer 102 to be lifted with it, even if the cash drawer 102 is not directly lifted itself.

Modular base piece 104 is illustratively configured to support connection to a variety of optional additional components that may be included as part of the cash drawer exoskeleton system 100. For example, modular base piece 104 is illustratively configured to couple to the cup 106, the printer 110, the cup 108 and the screen 112. As will become apparent, the modular base piece 104 includes a large number of connection points that can be utilized for facilitating connection to any number of optional additional components, or else if not needed, the connection points can be filled with a plug or left open. In other examples, the modular base piece 104 is configured to more or fewer components, not all possibilities of which are included in FIG. 1 or in any other drawing. It should also be pointed out that modular base piece 104 as described so far can to any degree be configured to be a permanent, integrally formed or temporary addition to cash drawer 102. In one example, modular base piece is made as an integral of (or at least more permanently coupled to) cash drawer 102. In another example, the connection is designed for temporary coupling and even convenient removability. All possibilities are contemplated.

In one embodiment, the cup 106 and the cup 108 are coupled to the modular base piece 104 by way of a connection point opening, illustratively but not necessarily similar to a connection point opening 124 shown on a top surface of the modular base piece 104. In one example, each of the cups 106 and 108 are coupled to the base piece 104 by way of a two-part connector system wherein one of the two parts is mated with the other two parts with a surface of the cup and/or a surface of a wall of the base plate piece 104 sandwiched there between. Of course, this specific mode of coupling should be considered exemplary only. Those skilled in the art will appreciate that there is a broad range of possible connection mechanisms that would be equally convenient. Further, the connection scheme could just as easily incorporate multiple connection point openings instead of just one. In one embodiment, cup 106 and cup 108 are configured to be interchangeable in that one can be swapped for the other with no problem. For instance, cup 106 can be designed to be the same as cup 108 except that it is vertically flipped.

In one embodiment, the cup 106 and/or cup 108 are configured to support connection to one or more additional components. For example, cup 108 is shown in a cup configuration wherein pens, hand sanitizer, or something else can be rested withing the open and retrieved easily. For example, cup 108 can be used as storage for pens that are used to sign receipts that are printed out from printer 110. In contrast, the cup 106 is reversed with the open volume facing down instead of up. As is shown, there is a connection opening similar to opening 124 formed in the bottom of cup 106. In one embodiment, this connection opening in the cup 106 is configured to support connection to a credit card terminal or some other device or peripheral. Thus, cup 106 operates as a stand instead of like a cup per se (compare to the cup 108 which is configured to operate as cup per se—though this assumes the connection opening in the bottom of cup 108 is sealed with a plug or else items like pens would be prone to falling through). In one embodiment, the connection opening formed in the cup 106 is configured to connect to and support a pole stand, such as a pole stand on which a credit card terminal is mounted.

Accordingly, the cup 108 is shown in an "up" position and the cup 106 is in a "down" position. In other examples, both cups 106 and 108 can be in the "up" or "down" position. Or, the configuration can be reversed compared to what is shown in FIG. 1.

Screen 112, which is an optional component, is configured to couple into the cash drawer exoskeleton system 100 sandwiched between modular base piece 104 and the series of components 106, 108 and 110. Screen 112 is illustratively configured to at least partially separate the point-of-sale employee (e.g., operator of the drawer 102) from the customer. Screen 112 may be used for health reasons (e.g., preventative pathogen transmission), for security reasons (e.g., a physical barrier) or for any other reason.

As shown, screen 112 has approximately the same width as modular base 104. In other examples, screen 112 can be larger to provide more health and security benefits. Some embodiments of this include screen 112 being wider, taller and/or including angled sides. Screen 112 is illustratively configured that that it may alternatively be positioned on a side of modular base piece 104 instead of, as is shown, more toward the back side of cash drawer 102. In one embodiment, in the scenario in which the screen is positioned along a side of modular base piece 104, the screen 112 is illustratively coupled to piece 104 via an coupling engagement with one or more of the circular connection ports located on top of the base 104. In one embodiment, screen 112 is a standalone item separate from cash drawer 102 and modular base piece 104.

Figure 2:
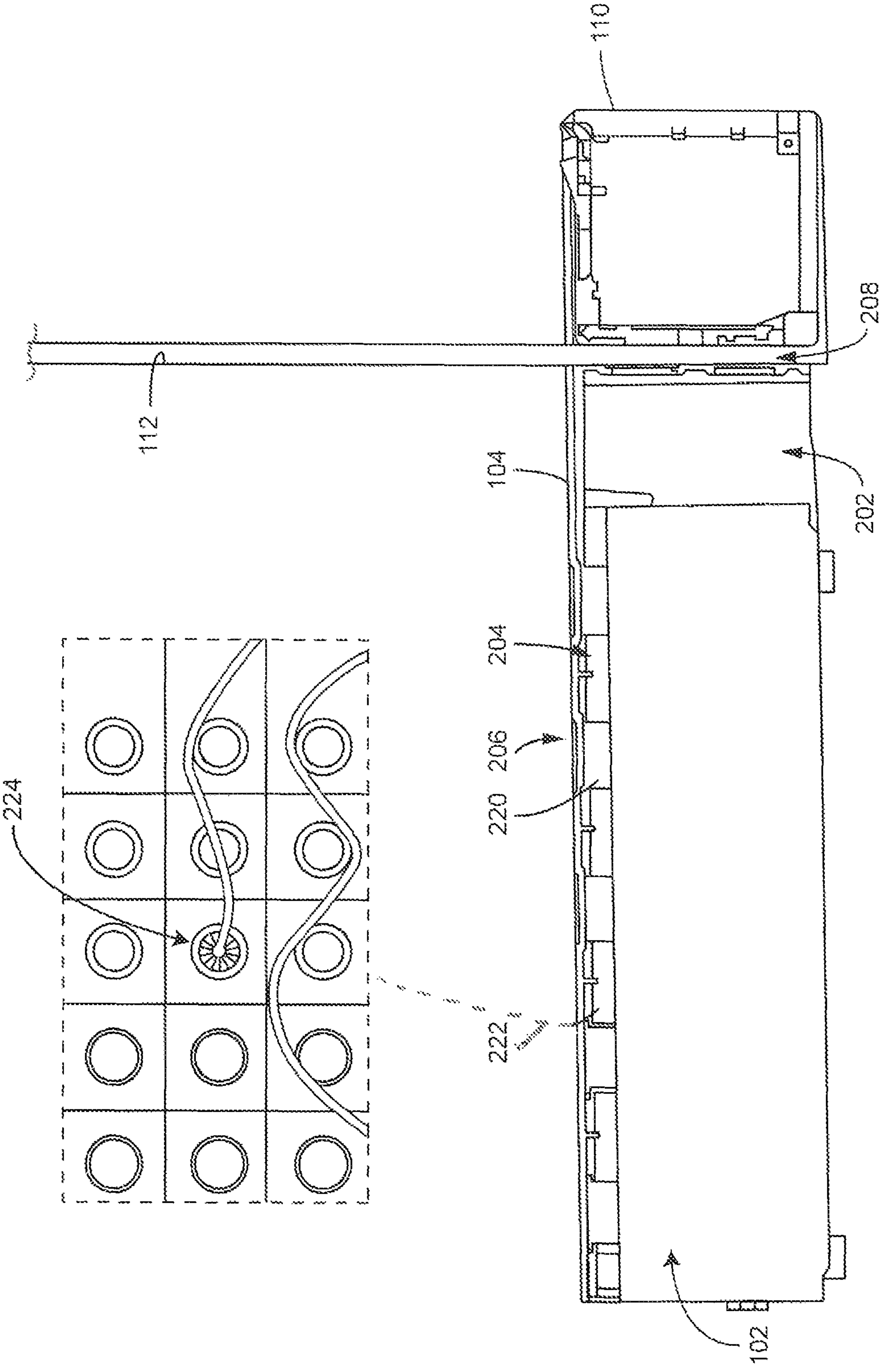
FIG. 2 is a cross-sectional view of an embodiment of the cash drawer exoskeleton system again shown in connection with the cash drawer.

FIG. 2 is a sectional view of an embodiment of a cash drawer exoskeleton system 100 shown in connection with a cash drawer 102, the sectional view being taken along a line similar to a line 120 identified in FIG. 1. The sectional view of FIG. 2 makes it easier to see a series of features formed in the modular base piece 104, namely, a void 202, a void 204, an aperture 206, and an aperture 208. Aperture is illustratively configured to enable the routing of wires, especially wires from components that are traditionally placed on top of cash drawer 102 but are now placed on the top surface of the modular base piece 104. It is to be understood that aperture 206 is one of many channels or apertures formed between a top surface of the cashdrawer 102 and a bottom surface of the modular base piece 104. In one embodiment, instead of the space between the top of cash drawer 102 and piece 104 being entirely open, it is interrupted by one or more circular standoffs or spacers 220 that each extend down from a plurality of apertures 206 formed through the top surface of modular base piece 104. It is the standoffs or spacers 220 that cause there to be enough space through which to route cables and cords. Of course, in one embodiment, the standoffs or spacers 220 are not completely cylindrical in order to provide a path for cords to be routed along through the channels accommodated by voids such as the void 204.

In some examples, apertures 206 are filled with a plug or, alternatively, filled with a functional insert. A pop out view 222 is provided in FIG. 2 in order to provide an example of what a bottom surface of the piece 104 looks like. In this case, a POS stand has illustratively been securely coupled to modular base piece 104 in an area 224. Within area 224, a cord routing plug has been inserted into the circular opening formed through piece 204. The cord routing plug is illustratively configured to snap into the circular opening and center a cord that is routed through the POS stand down into the void formed between the piece 104 and drawer 102.

Within area 224, there are illustratively an optional series of four coupling holes formed through piece 104 and symmetrically positioned around the cord routing plug that fills the larger circular opening that passes through piece 104. These coupling holes are illustratively consistent with a series of coupling mechanisms that are part of the POS stand. Connectors are illustratively run through the four coupling holes and into the POS stand in order to secure the POS stand to the piece 104. Again, the cord for the POS device, which illustratively mounts to the POS stand, is then routed through the cable routing plug and then run along the top of the cash drawer 102. In one embodiment, but not by limitation, the peripheral component mounted on the POS stand is a tablet screen or some other point-of-sale device. In one embodiment, the cord is also routed back into the aperture 202. In one embodiment, an opening or aperture formed in piece 102 proximate to printer 110 enables the cord to connect to the printer 110. In this way, the POS device now mounted on top of the piece 104 can be connected to the printer 110 with most or all of the cord that facilitates the connection being obscured from view.

Figure 3:
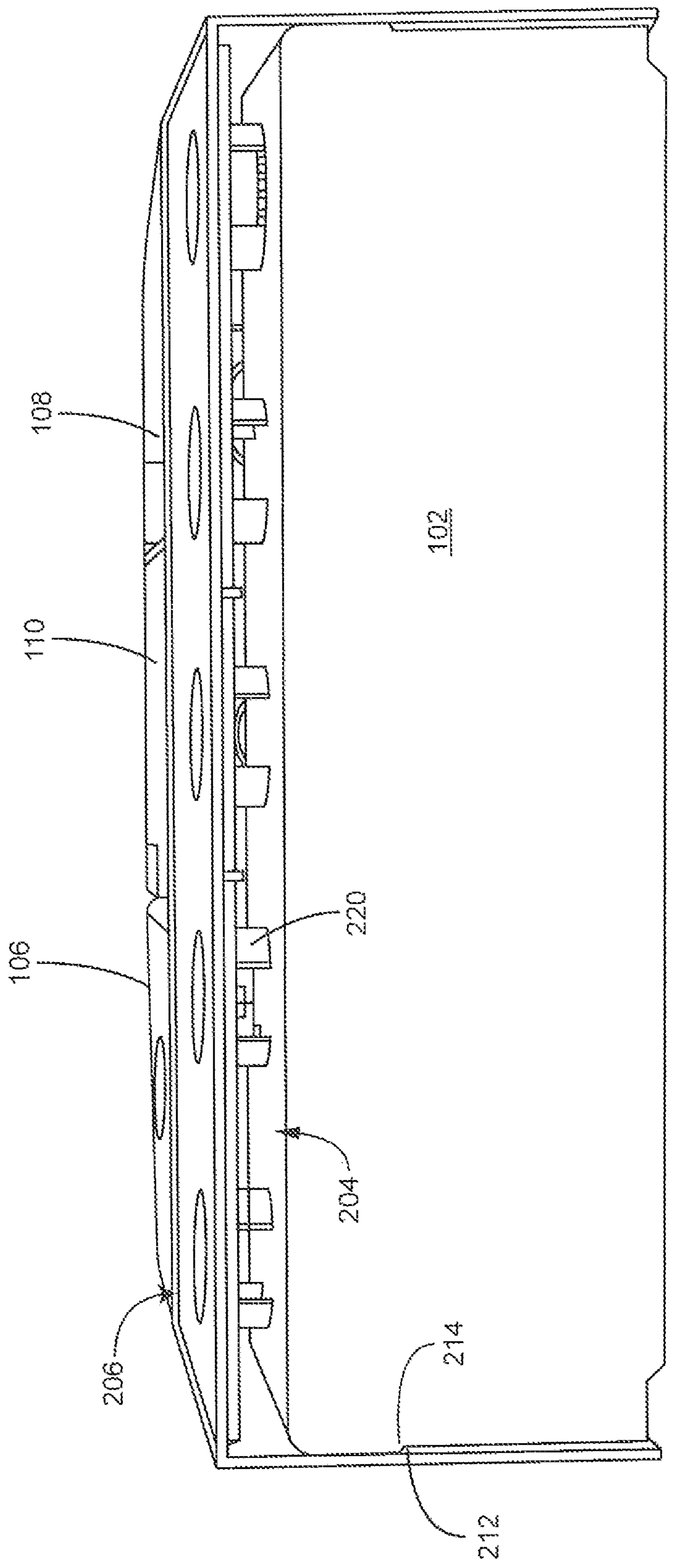
FIG. 3 is a cross-sectional view of an embodiment of the cash drawer exoskeleton system again shown in connection with the cash drawer.

FIG. 3 is a sectional view of an embodiment of a cash drawer exoskeleton system 100 shown in connection with a cash drawer 102, the sectional view this time being taken along a line similar to line 122 in FIG. 1. Modular base piece 104 as shown includes apertures 206, voids 204 and a connection feature 212. Apertures 206 and voids 204 were previously described with respect to FIG. 2. The standoffs or spacers 220 and the openings therein for court routing are also shown in FIG. 3.

The connection feature 212 is illustratively configured to facilitate a coupling of the modular base piece 104 to the cash drawer 102. The connection feature 212 as shown is illustratively a barbed fastener that engages a integrated fastener 214 of cash drawer 102. The integrated fastener 214 is illustratively an indentation in the side of the body of cash drawer 102. In addition, or instead, other systems for connecting cash drawer 102 and modular base piece 104 may be utilized. For example, neither integrated fastener 214 nor connection feature 212 need be integrally formed components and either or both can stead be separate add on pieces utilized for accomplishing a similar connection.

In still other examples of supporting a coupling between cash drawer 102 and modular base piece 104, a different coupling scheme entirely can also or alternatively be utilized. For example, in one embodiment, the modular base piece 104 also or alternatively couples to cash drawer 102 through utilization of an adhesive agent, magnets, or another mechanism for temporarily or permanently coupling the components together.

For example, with reference to FIG. 1, connectors 240 have been utilized to fill two of the plurality of openings formed through modular base piece 104. In one embodiment, the connectors 240 are equipped with an adhesive that facilitates a coupling of modular base piece 104 to cash drawer 102. Of course, other of the openings formed through the modular base piece 104 may be similarly equipped.

In still another embodiment, an adhesive connector that is part of a two-piece connection system is adhered or otherwise coupled to the top surface of the cash drawer 102. In this case, the connector 240 is then assumed to be a second portion of the two-part coupling system. When the two parts are connected together and, in one embodiment but not by limitation twisted, the modular base piece 104 becomes coupled to the cash drawer 102. All modes of facilitating connection of the modular base piece 104 to the cash drawer described herein should be considered examples only.

In still another embodiment, a magnetic connector that is part of the connector 240 is snapped or otherwise coupled to the top surface of the cash drawer 102. In this case, or in any case actually, the connector 240 need not necessarily be a two-part coupling system but can instead be a single part coupling mechanism. Regardless, the modular base piece 104 becomes coupled to the cash drawer 102. Again, all modes of facilitating coupling of the modular base piece 104 to the cash drawer described herein should be considered examples only.

Figure 4:
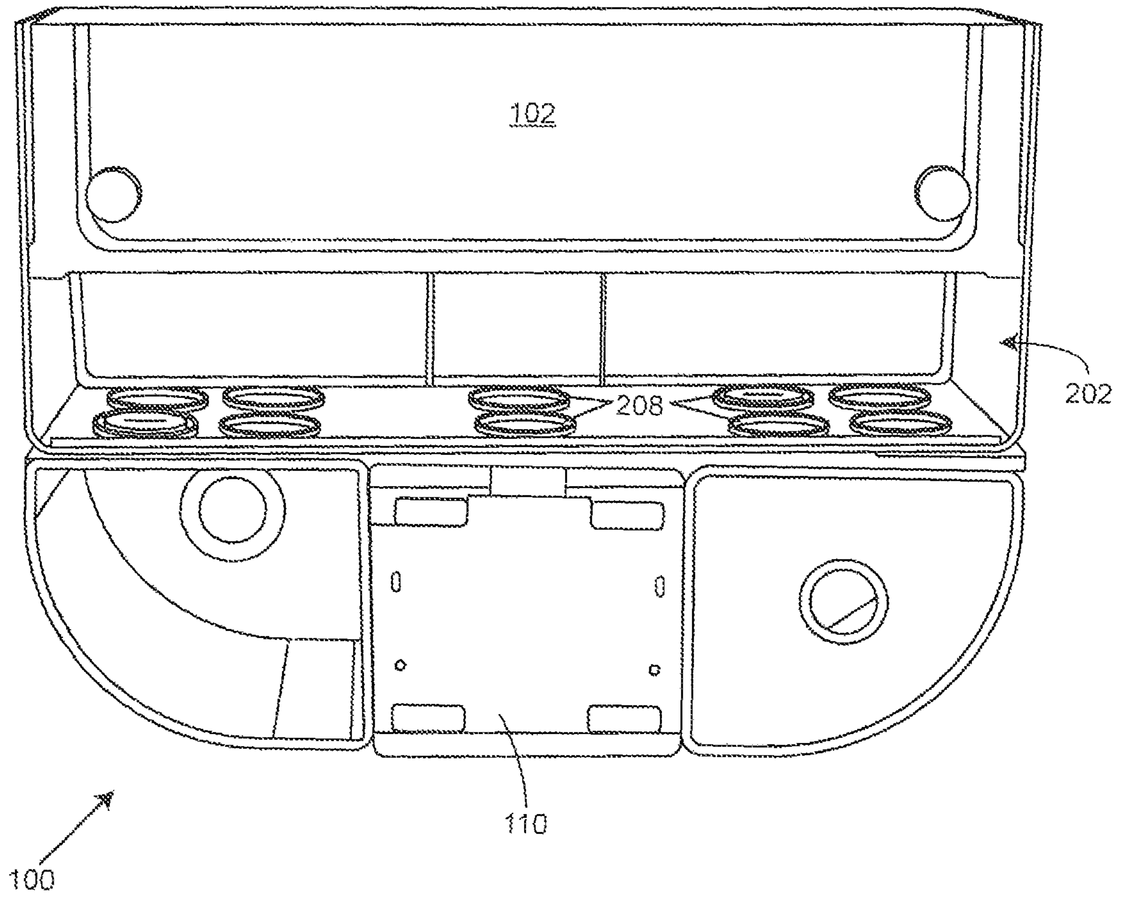
FIG. 4 is a partial bottom view of an embodiment of the cash drawer exoskeleton system again shown with the cash drawer, which is also shown as a partial view.

FIG. 4 is a partial bottom view of an embodiment of a cash drawer exoskeleton system 100 shown in connection with a cash drawer 102. In this view, void 202 and apertures 208 are now made visible. As shown, apertures 208 are formed so as to lead to corresponding openings in cup and printer components. As shown, there are ten apertures 208, in other examples, there may be a greater or fewer number of apertures 208 that allow for communication with peripheral accessories. Some or all of apertures 208 are optionally filled with plugs, with functional cord guiding devices, or with another functional accessory.

Figure 5:
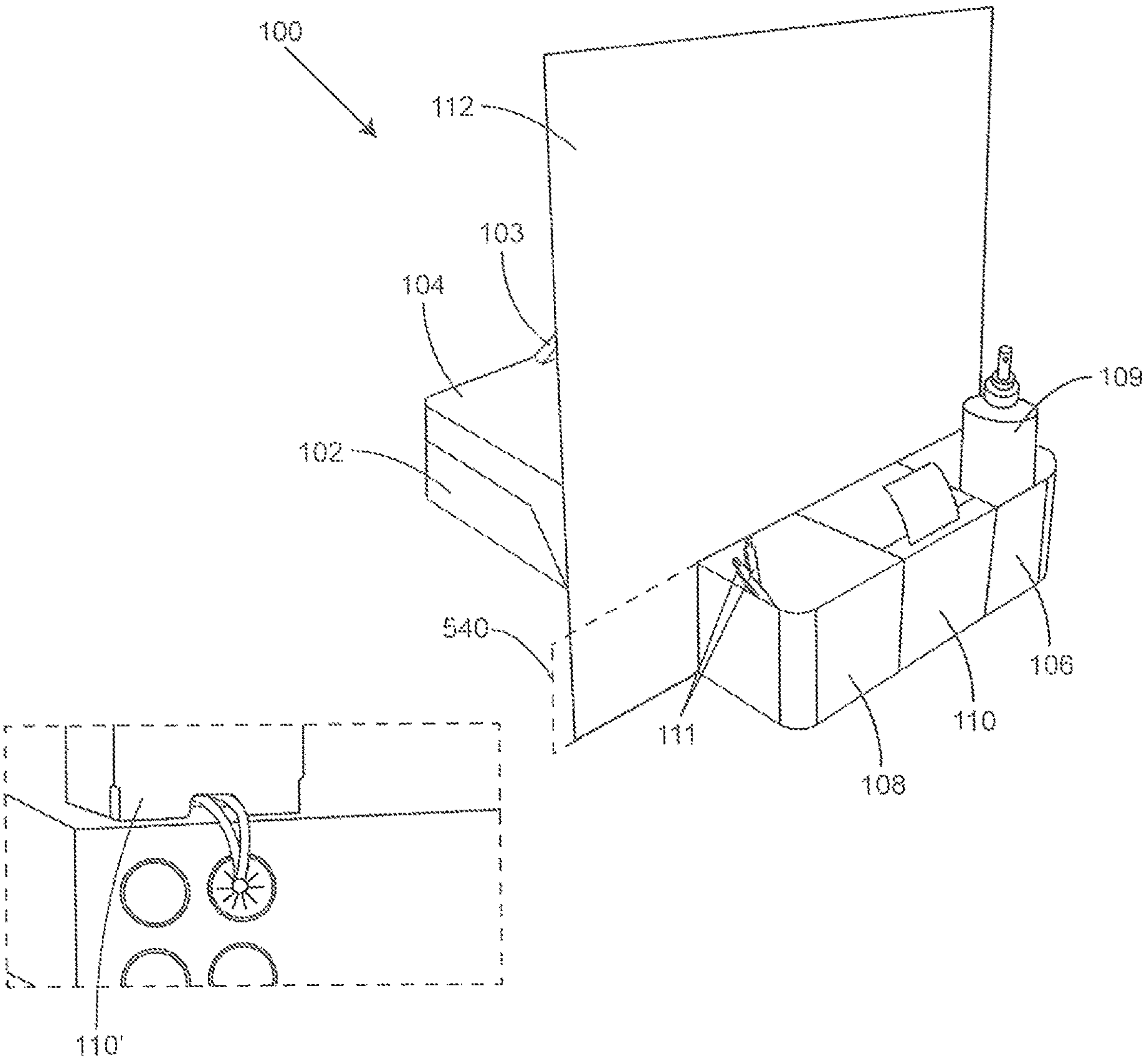
FIG. 5 is a perspective view of an embodiment of the cash drawer exoskeleton system again shown in connection with the cash drawer.

FIG. 5 is a perspective view of an embodiment of a cash drawer exoskeleton system 100 shown in connection with a cash drawer 102. In this case, a terminal 103, accessories 111, and hand sanitizer 109 have been added to the view in order to convey a better understanding of how the system operates within an actual retail environment. Those skilled in the art will appreciate that cords can be routed through modular base piece 104 in many different ways to support cord-concealed (or at least mostly concealed) connections to many different devices mounted in many different ways within the cash drawer exoskeleton system 100.

For Example, a cord illustratively maybe routed from the terminal 103 to a power supply that is concealed/stored within void 202. Another cord leading from the power supply to out side of the system 100 (e.g., to be plugged into the wall) may be routed through one of the circular openings formed in the modular base piece 104 as well. Or, a cord may be routed from the terminal to the printer 110, as has been described. Or, a credit card terminal may be mounted on a stand coupled to and supported by a flat side of one of cups 106 or 108, in which case a cord can be routed through the system 100 between the terminal 103 and the credit card machine. Those skilled in the art will appreciate the flexibility for cord routing and device mounting provided by the cash drawer exoskeleton system 100.

The power supply concealed in void 202 need not necessarily be for powering a POS system but instead may be for powering cash drawer 102, for example. Cords can simply be routed where they need to go in order to facilitate interoperability of components but also do so in a way that prevents visible cord clutter.

As is demonstrated by a pop out 540 in FIG. 5, a given implementation of cash drawer exoskeleton system 100 need not have every component. In the pop out 540, a printer 110' is illustratively mounted directly on top of a modular base piece 104 (e.g., mounted utilizing one of the circular opening to facilitating a coupling). The cords from the printer have then been routed through a back panel of the base piece 104 utilizing a cord centering insert to facilitate a clean transition. The cords are illustratively routed into the void 202 and, from there, can be routed to other components as needed.

Figure 6:
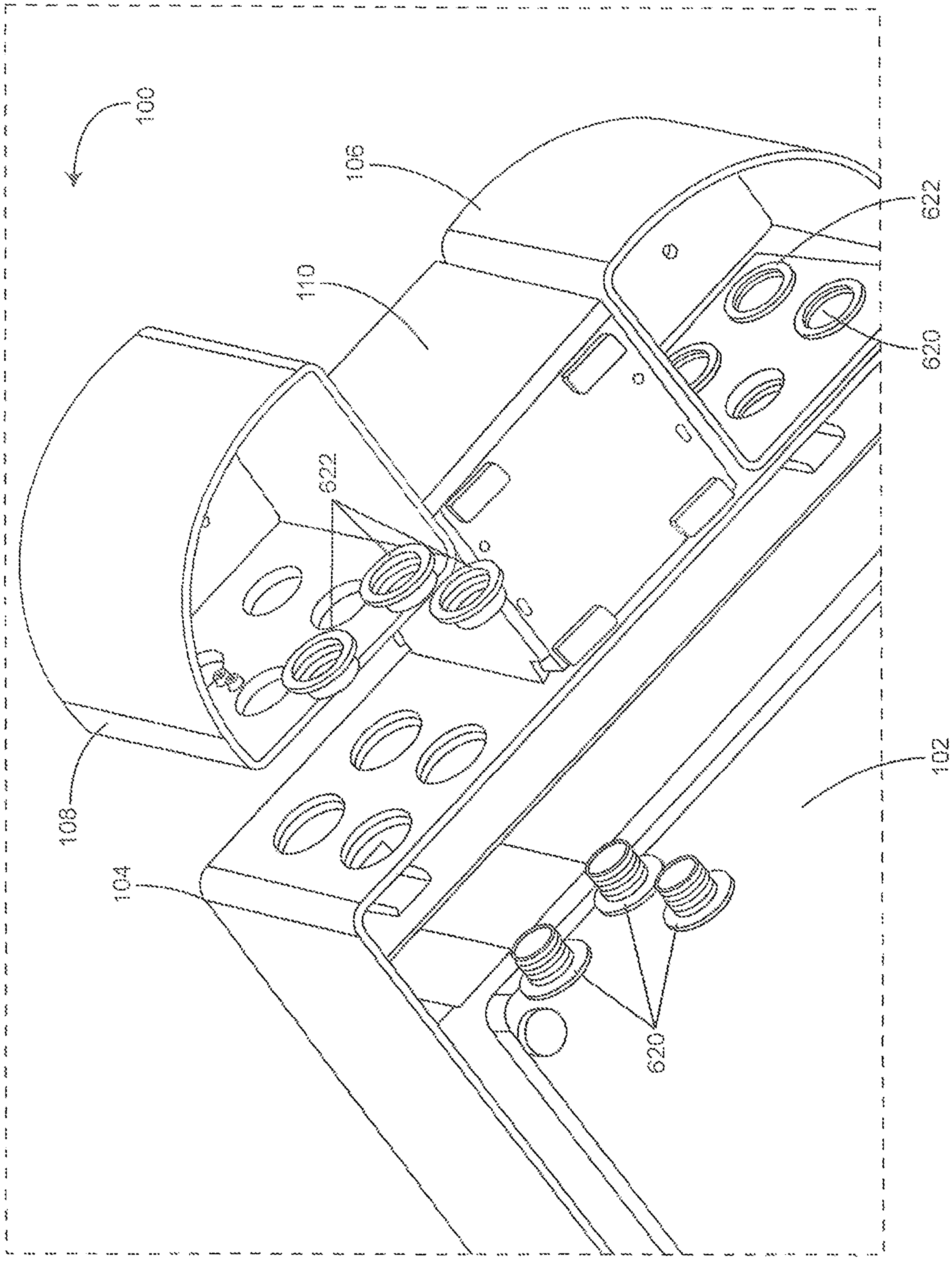
FIG. 6 is a partial, bottom, assembly, perspective view of an embodiment of the cash drawer exoskeleton system again shown with the cash drawer, which is also shown as a partial view.

FIG. 6 is a partial bottom perspective view of an embodiment of a cash drawer exoskeleton system 100 shown in connection with a cash drawer 102. Couplers 620 and 622 are configured to facilitate a coupling of component 106 and modular base piece 104. A coupler 622 is illustratively disposed on one side of the point of connection and corresponding coupler 620 is disposed on the other side. Coupler 620 is then illustratively threaded into coupler 622 with the point of connection in between so as to lock the components together and cause the securing of the system 100 components. Coupler 622 illustratively includes a locking mechanism that deters rotation of coupler 622 such that coupler 620 more easily threads into coupler 622 (e.g., coupler 622 does not necessarily need to be held manually to deter movement).

As shown, couplers 620 and 622 couple components 106 and 108 to piece 104. In other examples, couplers 620 and 622 may be utilized to couple component 106 and/or 108 to another circular connection point formed within the modular base piece 104. In some examples, couplers similar to 620 and 622 are utilized to couple printer 110 to modular base piece 104. As shown, couplers 620 and 622 may optionally be formed with an aperture running through the center to enable a path through which cables or other objects may be routed. In still other examples, any number of POS and other components, as well as stands for supporting such components, are illustratively couplable to modular base piece 104 via couplers the same or similar to 620 and 622. However, holes to accommodate other forms and systems of coupling may also be included within piece 104, such as the coupling point 224 described herein. Similarly, coupling accommodations such but not limited to the coupling point 224 can just as easily be included in any component of system 100 such as but not excluding cups 106 and 108. In one embodiment, cup 106 and/or 108 include an coupling point 224 formed in their bottom (i.e, a large through hole similar to other through holes in system 100 and/or four or more satellite holes around the large through hole).

Although the present invention has been described with reference to preferred embodiments, workers skilled in the art will recognize that changes may be made in form and detail without departing from the spirit and scope of the invention.

What is claimed is:

1. A cash drawer exoskeleton system, comprising:

a modular base piece having an integrated fastener configured to facilitate a coupling to a cash drawer;

an aperture formed through a top surface of the modular base piece and leading to an area where the cash drawer is positioned when the modular base piece is coupled to the cash drawer utilizing the integrated fastener; and at least one spacer configured to facilitate creation of a gap between the modular base piece and the cash drawer when the modular base piece is coupled to the cash drawer utilizing the integrated fastener.

2. The cash drawer exoskeleton of claim 1, wherein the at least one spacer is positioned proximate to the aperture on an underside of the modular base piece.

3. The cash drawer exoskeleton of claim 1, wherein the at least one spacer has an opening therein configured to support a routing of a cable through an area between the modular base piece and the cash drawer when the modular base piece is coupled to the cash drawer utilizing the integrated fastener.

4. The cash drawer exoskeleton of claim 1, wherein the integrated fastener is a magnetic or adhesive connector that engages through the aperture formed through the top surface.

5. The cash drawer exoskeleton of claim 4, wherein the aperture formed through the top surface of the modular base piece has an overall size and shape that is the same as the overall size and shape of an aperture formed in the cup.

6. The cash drawer exoskeleton of claim 4, wherein the aperture formed through the top surface of the modular base piece is configured to be closed with a plug having an overall size and shape that makes it also appropriate for closing an aperture formed in the cup.

7. The cash drawer exoskeleton of claim 1, wherein the integrated fastener is a barbed fastener.

8. A modular base piece that is part of a cash drawer exoskeleton system, the modular base piece comprising:

a first series of cord routing apertures formed through a top surface of the modular base piece and leading to an area where a cash drawer is positioned when the modular base piece is coupled to the cash drawer;

a second series of cord routing apertures formed through a back wall of the modular base piece and leading to a void area that is empty when the cash drawer is coupled to the modular base; and a plug having a shape that is consistent with a shape of the first and second series of cord routing apertures such that the plug can be utilized to fill any one of the cord routing apertures included in the first or second series.

9. The modular base piece of claim 8, further comprising a standoff for separating the modular base piece from the cash drawer when the modular base piece is coupled to the cash drawer.

10. The modular base piece of claim 8, further comprising a plug having an overall size and shape making it appropriate to close any one of the cord routing apertures included in the first or second series.

11. A cash drawer exoskeleton system, comprising:

a modular base piece configured to set over a cash drawer;

a spacer configured to maintain a gap between the modular base piece and the cash drawer when the modular base piece is set over the cash drawer; and a series of connection apertures formed through the modular base piece and distributed at least on top and on at least one side of the modular base piece.

12. The cash drawer exoskeleton of claim 11, further comprising a cup coupled to the modular base piece at a point of the connection apertures formed through a base on a side of the modular base piece.

13. The cash drawer exoskeleton of claim 11, further comprising an accessory coupled to the modular base piece at one of the substantially uniform connection apertures, wherein the accessory is coupled to the modular base piece with a connector that fits within the one of the connection apertures.

14. The cash drawer exoskeleton of claim 13, wherein the accessory is a cup.

15. The cash drawer exoskeleton of claim 13, wherein the accessory is a stand for supporting an electronic peripheral device.

16. The cash drawer exoskeleton of claim 11, further comprising a cord routing plug that fills at least one of the connection apertures.

17. The cash drawer exoskeleton of claim 11, further comprising a plug that fills at least one of the connection apertures.

18. The cash drawer exoskeleton of claim 11, wherein the series of connection apertures is at least eight apertures.

* * * * *